US007162233B2

(12) United States Patent
Chiba

(10) Patent No.: US 7,162,233 B2
(45) Date of Patent: Jan. 9, 2007

(54) ELEVATOR CALL REGISTRATION SYSTEM

(75) Inventor: Yuji Chiba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/545,625

(22) PCT Filed: Apr. 7, 2004

(86) PCT No.: PCT/JP2004/005005

§ 371 (c)(1),
(2), (4) Date: Aug. 16, 2005

(87) PCT Pub. No.: WO2005/100222

PCT Pub. Date: Oct. 27, 2005

(65) Prior Publication Data

US 2006/0144644 A1 Jul. 6, 2006

(51) Int. Cl.
*H04M 3/00* (2006.01)

(52) U.S. Cl. ................ 455/420; 455/422.1; 455/435.1; 187/382; 187/392

(58) Field of Classification Search ................ 455/420, 455/422.1, 435.1
See application file for complete search history.

(56) References Cited

U.S. PATENT DOCUMENTS

| | | | | |
|---|---|---|---|---|
| 4,709,788 | A * | 12/1987 | Harada | 187/382 |
| 5,554,832 | A | 9/1996 | Lumme et al. | |
| 5,817,994 | A * | 10/1998 | Fried et al. | 187/391 |
| 6,109,396 | A | 8/2000 | Sirag et al. | |
| 6,202,799 | B1 * | 3/2001 | Drop | 187/388 |
| 6,223,160 | B1 | 4/2001 | Kostka et al. | |
| 6,868,945 | B1 | 3/2005 | Schuster et al. | |
| 2003/0159890 | A1 | 8/2003 | Schuster et al. | |
| 2004/0060777 | A1 | 4/2004 | Takeuchi | |

FOREIGN PATENT DOCUMENTS

| | | |
|---|---|---|
| JP | 6-325265 | 11/1994 |
| JP | 9-188481 | 7/1997 |
| JP | 2001-2333 | 9/2001 |
| JP | 2002-117173 | 4/2002 |
| JP | 2002-128406 | 5/2002 |
| JP | 2002-179347 | 6/2002 |
| JP | 2002-183007 | 6/2002 |
| JP | 2003-226473 | 8/2003 |

* cited by examiner

*Primary Examiner*—Lester G. Kincaid
*Assistant Examiner*—Fred A. Casca
(74) *Attorney, Agent, or Firm*—Leydig, Voit & Mayer, Ltd.

(57) ABSTRACT

In an elevator call registration system, elevator-related information is constantly transmitted from an elevator call registration server, and a call registration reservation for a desired elevator can be made by selecting contents from the information. Therefore, it is not necessary for the user to access a site where necessary contents are stored, enabling an easy call registration reservation. Further, since the call registration detects that the user is approaching the reserved elevator, the car is positioned at a good time and the user can smoothly go to a desired floor.

3 Claims, 11 Drawing Sheets

FIG. 3

| | | | | | |
|---|---|---|---|---|---|
| HEADER | PORTABLE TERMINAL ID | BASE STATION NUMBER | BUILDING NUMBER | NUMBERS OF CONTENTS (BANK, MACHINE NUMBER, FLOOR, ETC.) | PRESENCE OR ABSENCE OF REGISTRATION |

FIG. 6

| PORTABLE TERMINAL ID | CURRENT POSITION (BASESTATION NUMBER) | SELECTED-BASESTATION NUMBER | SELECTED-BUILDING NUMBER |
|---|---|---|---|
| 9012345678 | 1001 | 1002 | 1 |
| 9012312345 | 1003 | 1002 | 1 |
| | | | |
| | | | |

FIG. 8

| PORTABLE TERMINAL ID | CALL DATA (BANK) | CALL DATA (MACHINE NUMBER) | CALL DATA (FLOOR) |
| --- | --- | --- | --- |
| 9012345678 | 1 | 1, 2 | 11 |
| 9012312345 | 2 | 1 | 5 |
| | | | |
| | | | |

(a) (b)

ELEVATOR CALL REGISTRATION SYSTEM

TECHNICAL FIELD

The present invention relates to an elevator call registration system with which a user can perform an elevator call registration from inside and outside of a building by using a portable terminal or the like.

BACKGROUND ART

As described in JP 2002-117173 A, a conventional elevator call registration system includes: a plurality of mobile communication means provided in a building, for exchanging signals with a portable information terminal carried by a user; position information management means for managing position information of the portable information terminal by collecting information from the plurality of mobile communication means; elevator control means for transmitting a call registration control signal to an elevator control device; and guide information management means for transmitting, when being accessed from the portable information terminal, inside-building guide menu information for selecting various services to the portable information terminal, for transmitting, when an inside-building destination guide service is selected, destination menu information for selecting a destination in the building to the portable information terminal, and for transmitting, when a destination is selected, guide information including the selected destination and a current position of the user based on the transmitted destination information and position information of the portable information terminal to the portable information terminal.

However, to perform an elevator call registration, the user accesses the guide information management means by using the portable information terminal and then performs a call registration with the use of related inside-building guide menu, so there is a problem in that the user has to voluntarily access thereto.

Further, since the user has to search the inside-building guide menu information structured in hierarchy from which various services are to be selected, for necessary contents, there is a problem of a complicated procedure to reach the call registration.

Furthermore, there is a problem in that not many people dare to access a particular content to perform a call registration for an elevator in a particular building, so the system is used by only limited people.

An object of the present invention is to provide an elevator call registration system with which when performing an elevator call registration or reservation for the registration, the user can perform the call registration or reservation for the registration for an elevator in a desired building by selecting contents based on information transmitted to a portable terminal.

DISCLOSURE OF THE INVENTION

According to the present invention, there is provided an elevator call registration system including: a portable terminal carried by a user; a plurality of base stations that exchange signals with the portable terminal in communication areas; an elevator call registration server that manages an elevator call registration performed via the base station by the user, who carries the portable terminal; and an elevator control device that performs an elevator call registration based on an instruction from the elevator call registration server, in which: the portable terminal transmits call registration information to the base station based on a various-service guide menu constantly transmitted from the elevator call registration server, and periodically transmits its own portable terminal identification information to the base station; the base station transmits additional registration information in which own base station identification information is added to the received call registration information, to the elevator call registration server, and transmits portable-terminal position information in which the own base station identification information is added to the received portable terminal identification information, to the elevator call registration server; and the elevator call registration server includes various-service control means for constantly transmitting the various-service guide menu to the portable terminal and call registration management means for identifying a corresponding elevator based on the additional registration information transmitted from the portable terminal via the base station, storing, as reservation registration information, base station identification information of the base station that is provided in a communication area in which a building having the identified elevator installed therein is located and the portable terminal identification information of the portable terminal, determining whether or not the portable terminal is in the communication area in which the building having the identified elevator installed therein is located from the portable-terminal position information concerning the portable terminal and the reservation registration information, and instructing, when the portable terminal is in the communication area, the elevator control device that the user is approaching as well as transmitting elevator call data.

An effect of the elevator call registration system of the present invention is that elevator-related information is constantly transmitted from the elevator call registration server, and a call registration reservation for a desired elevator can be made by selecting contents from the information, so it is unnecessary for the user side to access a site in which necessary contents are stored, enabling easy reservation for the call registration.

BRIEF DESCRIPTION OF THE DRAWINGS

FIG. 3 is a configuration diagram of a communication frame of registration information transmitted from the portable terminal to a base station.

FIG. 6 shows a data structure of reservation registration information stored in the elevator call registration server of FIG. 5.

FIG. 8 shows a data structure of call registration information stored in the elevator control device of FIG. 7.

BEST MODE FOR CARRYING OUT THE INVENTION

First Embodiment

Figure 1:
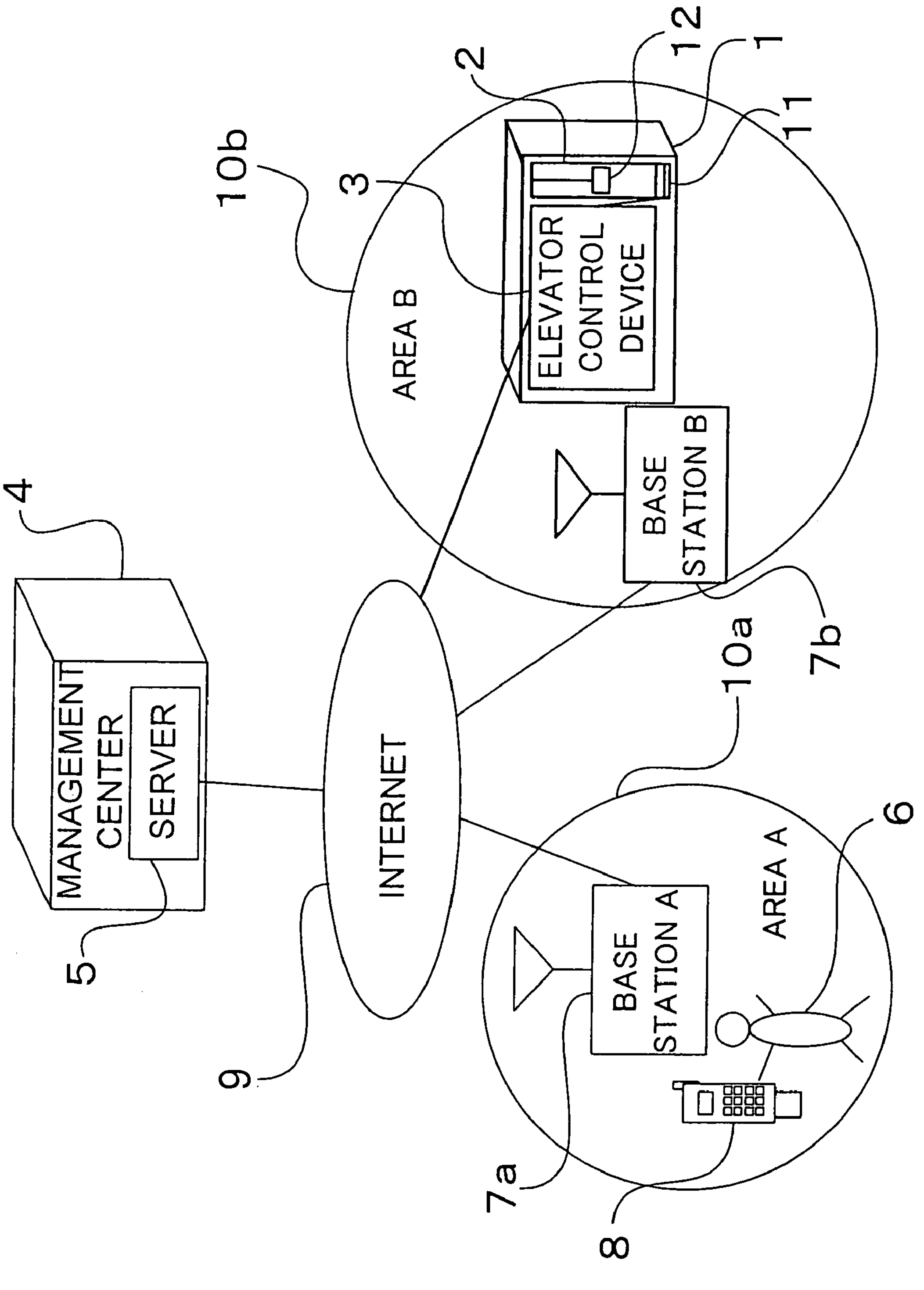
FIG. 1 is a block diagram of an elevator call registration system according to a first embodiment of the present invention.

FIG. 1 is a block diagram of an elevator call registration system according to a first embodiment of the present invention.

The elevator call registration system includes an elevator 2 provided in a building 1 for lifting and lowering passengers, an elevator control device 3 for controlling the elevator 2, an elevator call registration server 5 provided in a management center 4 which includes the elevator control device 3 in its management area, base stations 7*a* and 7*b* for exchanging information between a user 6 who uses the elevator 2 and the elevator call registration server 5, and a portable terminal 8 carried by the user 6. The base stations 7*a* and 7*b*, the elevator call registration server 5, and the elevator control device 3 are connected to one another through a communication line 9 such as the Internet.

The base stations 7*a* and 7*b* are located in areas (hereinafter, referred to as communication areas) 10*a* and 10*b*, respectively, where they can communicate with the portable terminal 8. Although the two communication areas, the area A 10*a* and the area B 10*b*, are taken as an example in the following description, the number of the communication areas is not limited to two. It is assumed that the user 6 is in the area A 10*a*, and the building 1 that the user 6 is going to enter is in the area B 10*b*.

An elevator driving device 11 is connected to the elevator 2, and the elevator control device 3 controls the elevator driving device 11 to move a car 12 up and down in an elevator shaft. When a call input is input from a call button provided in a hall or the like (not shown), a call registration is performed and the elevator control device 3 guides the car 12 to the hall where the call is made to provide a service.

Figure 2:
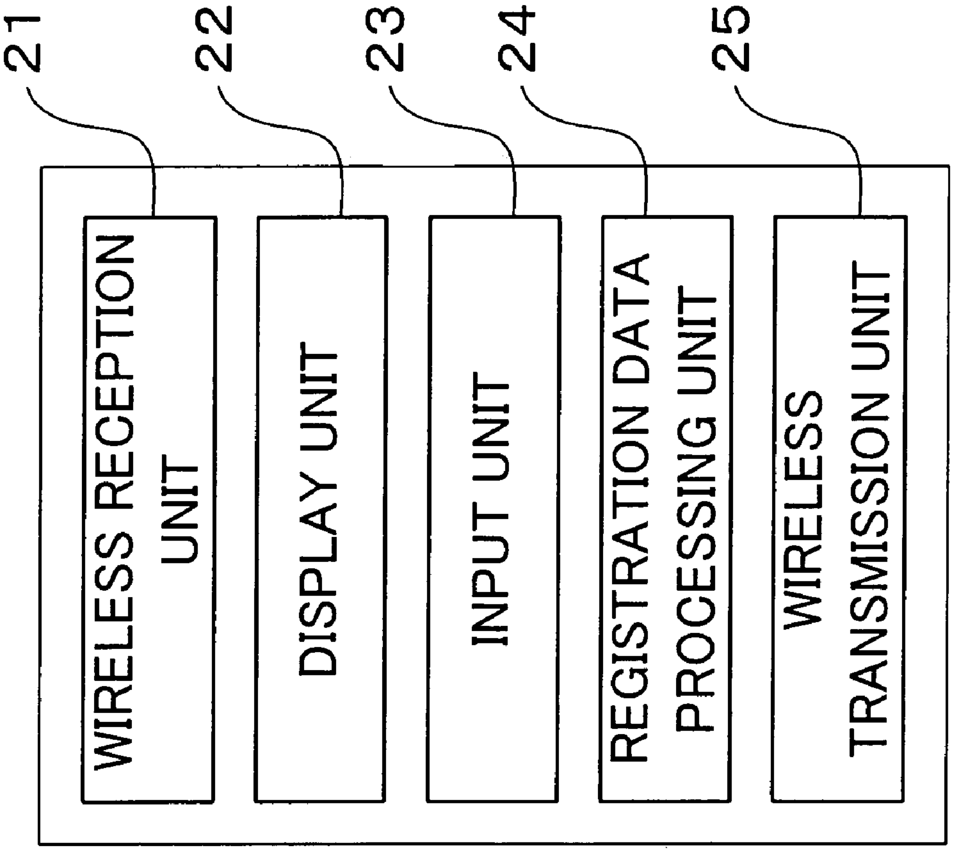
FIG. 2 is a functional block diagram of a portable terminal according to the first embodiment.

Next, functions of the portable terminal 8 will be described. FIG. 2 is a functional block diagram of the portable terminal 8.

The portable terminal 8, which is carried by the user 6, includes a wireless reception unit 21 for receiving area-basis building information relating to the elevator call registration, serving as various-service guide menu, and transmitted from the base station (7*a*, 7*b*), and a display unit 22 for displaying the received area-basis building information. Further, the portable terminal 8 includes an input unit 23 with which the user selects contents such as a bank, a machine number, and a floor, while viewing the displayed area-basis building information, a registration data processing unit 24 for creating registration information based on the selected contents, and a wireless transmission unit 25 for transmitting the registration information to the elevator call registration server 5 through the base station (7*a*, 7*b*). Further, the wireless transmission unit 25 of the portable terminal 8 periodically transmits a portable terminal ID serving as identification information assigned to itself to the elevator call registration server 5 through the base station (7*a*, 7*b*).

FIG. 3 shows a communication frame of registration information transmitted from the wireless transmission unit 25 to the base station (7*a*, 7*b*). The communication frame of the registration information is composed of slots of: a header, a portable terminal ID assigned to itself, the number of a base station in the communication area where a selected building exists, a selected-building number, the numbers of selected contents such as a bank, a machine number, and a floor, and the presence or absence of registration.

Note that an ordinary portable telephone can be also used as the portable terminal 8 by separately providing a wireless reception unit and a wireless transmission unit that satisfy a wireless transmission/reception standard of the elevator call registration system of the present invention. In addition, a portable personal computer provided with a wireless communication function can be used as the portable terminal 8 as well.

Figure 4:
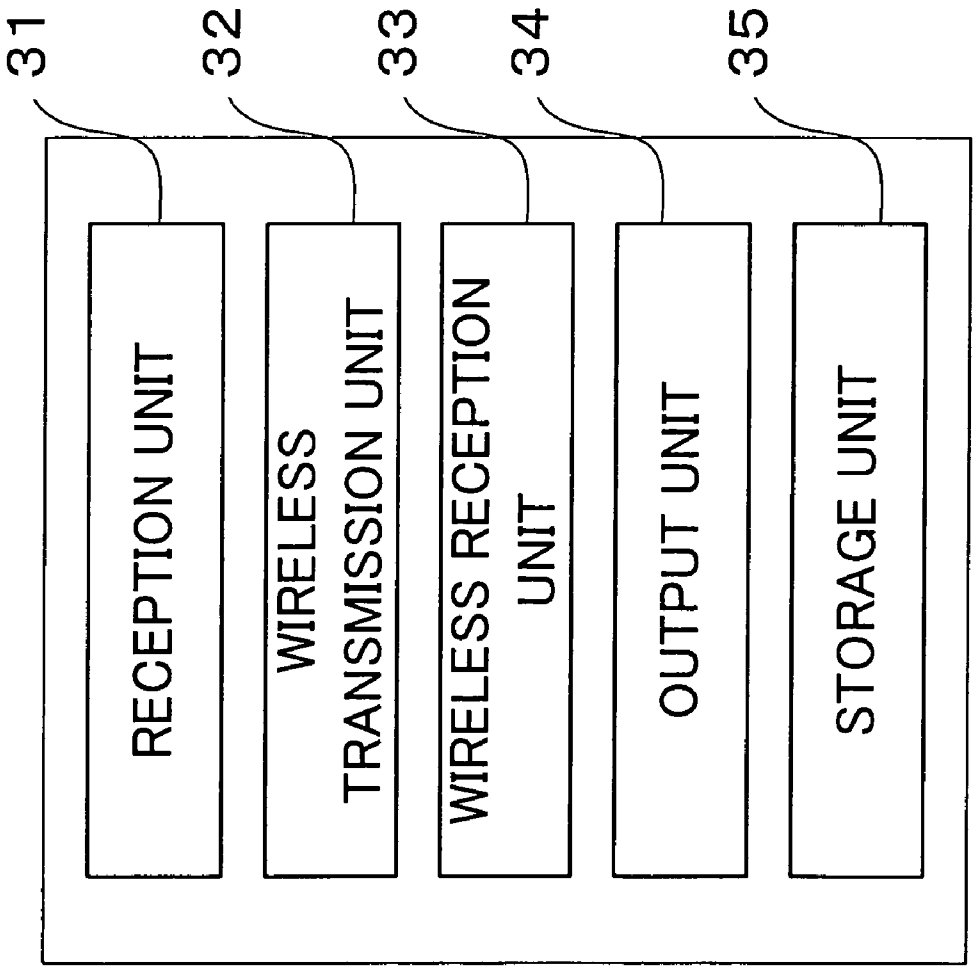
FIG. 4 is a functional block diagram of the base station according to the first embodiment.

Next, functions of the base stations 7*a* and 7*b* will be described with reference to FIG. 4. FIG. 4 is a functional block diagram of the base stations 7*a* and 7*b*.

Each of the base stations 7*a* and 7*b* includes a reception unit 31 for receiving area-basis building information serving as various-service guide menu, or the like transmitted from the elevator call registration server 5, a wireless transmission unit 32 for radio-transmitting the received area-basis building information or the like to the portable terminal 8 carried by the user in its area, a wireless reception unit 33 for radio-receiving registration information radio-transmitted from the portable terminal 8, an output unit 34 for outputting additional registration information in which a base station number serving as its own identification information is added to the radio-received registration information, and a storage unit 35 in which its own base station number is stored.

The wireless reception unit 33 receives the portable terminal ID periodically radio-transmitted from the portable terminal 8, and the output unit 34 adds its own base station number to the portable terminal ID and transmits them as portable-terminal position information to the elevator call registration server 5.

Figure 5:
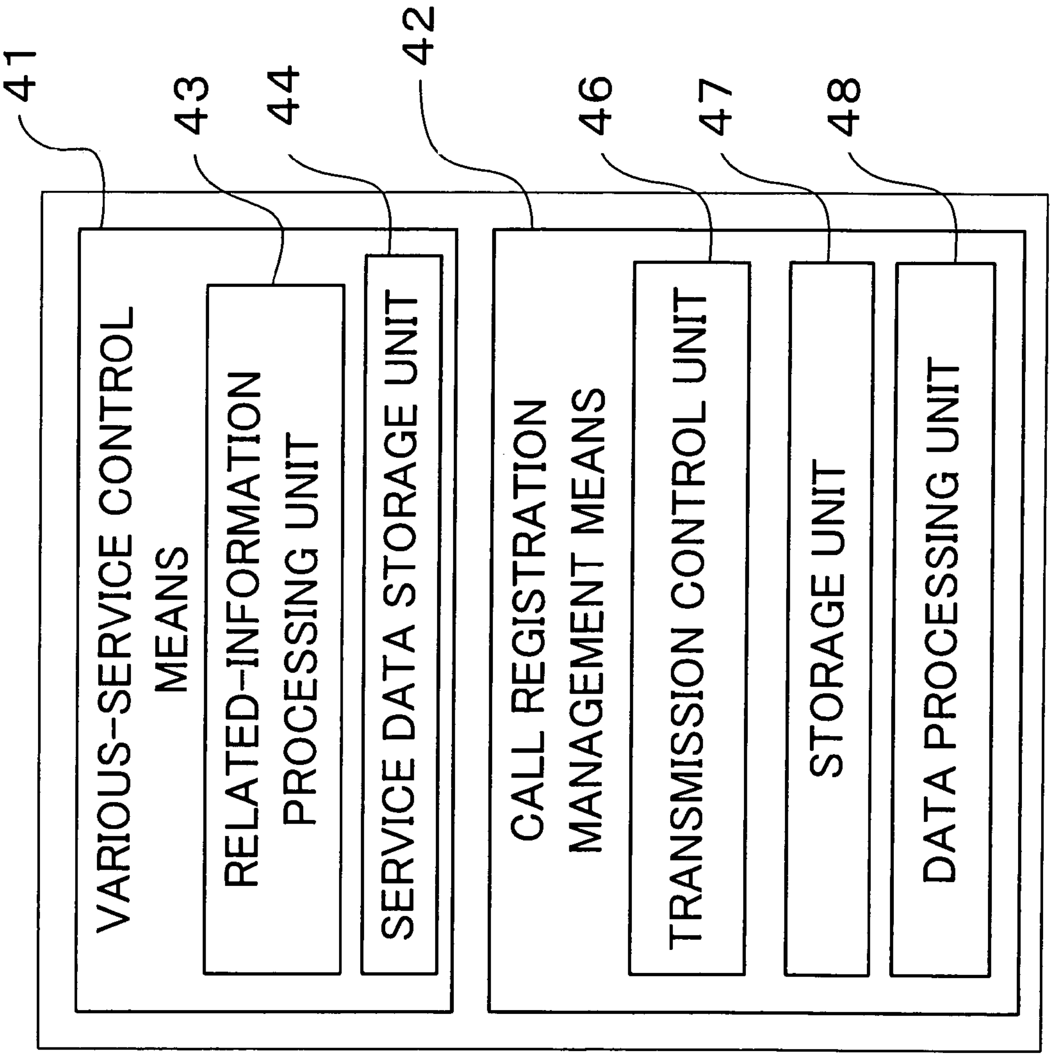
FIG. 5 is a functional block diagram of an elevator call registration server according to the first embodiment.

Next, functions of the elevator call registration server 5 will be described with reference to FIG. 5. FIG. 5 is a functional block diagram of the elevator call registration server 5.

The elevator call registration server 5 has a various-service control means 41 for updating and storing elevator-related information such as tenant advertisements and events which are stratified by base stations, buildings, floors, and shops, and a call registration management means 42 for managing elevator call registrations performed between the portable terminal 8 and the elevator control device 3.

The various-service control means 41 includes a related-information processing unit 43 for regularly or irregularly updating elevator-related information such as tenant advertisement contents and event contents, and a service data storage unit 44 for storing the elevator-related information.

The call registration management means 42 includes a transmission control unit 46 for exchanging information between the base station (7*a*, 7*b*) and the elevator control device 3, a storage unit 47 for storing information transmitted from the various-service control means 41 and the base station (7*a*, 7*b*), and a data processing unit 48 for creating information to be transmitted to the base station (7*a*, 7*b*) and the elevator control device 3 based on the received information.

The data processing unit 48 reads elevator-related information from the various-service control means 41, edits it to create area-basis building information for each base station, and transmits the area-basis building information to the base station (7*a*, 7*b*). The area-basis building information edited for the base station (7*a*, 7*b*) includes tenant advertisements and event information about buildings located in plural areas around the base station (7*a*, 7*b*).

Further, the data processing unit 48 outputs call data, such as a bank, a machine number, and a floor, and a portable terminal ID to a corresponding elevator control device 3 based on the additional registration information.

Further, the data processing unit 48 stores in the storage unit 47 reservation registration information such as the number of a base station which includes a corresponding building in its communication area, a corresponding-building number, and a portable terminal ID, based on the additional registration information.

Further, the data processing unit 48 determines whether the portable-terminal position information transmitted from the base station (7*a*, 7*b*) matches reservation registration information stored in the storage unit 47, and notifies, when they match, the elevator control device 3 of approaching information which indicates that a registered user is located in a vicinity of the elevator.

FIG. 6 shows a data structure of the reservation registration information stored in the storage unit 47 of the call registration management means 42. FIG. 6 shows the data structure of the reservation registration information stored in the storage unit 47. A field stores the portable terminal ID of the portable terminal 8 carried by the user who has reserved, and records store the number of a base station used at a time of the reservation, the number of a base station in the communication area where a building for which the reservation has been made exists, and a selected-building number, which correspond to each portable terminal ID. These pieces of information are read from the additional registration information and stored.

Figure 7:
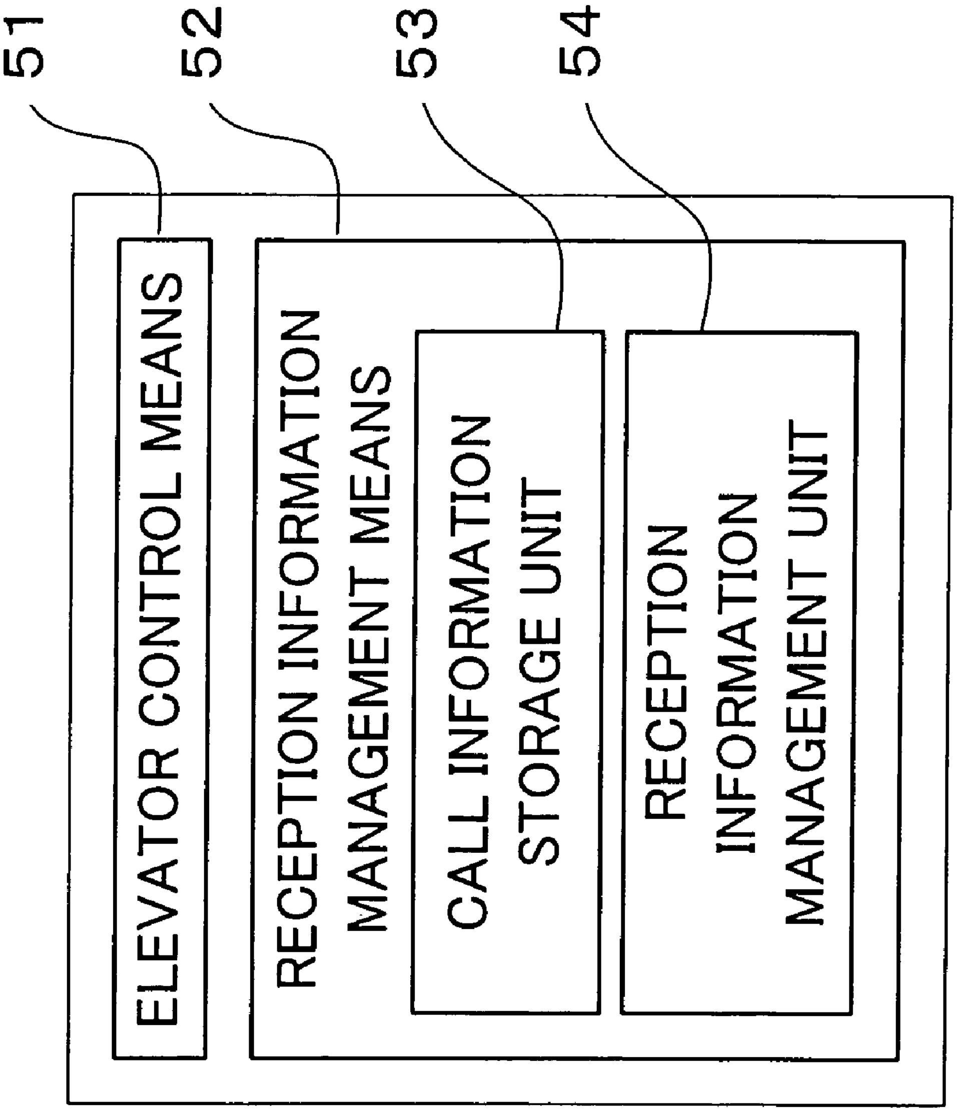
FIG. 7 is a functional block diagram of an elevator control device according to the first embodiment.

Next, functions of the elevator control device 3 will be described with reference to FIG. 7. FIG. 7 is a functional block diagram of the elevator control device 3.

The elevator control device 3 has an elevator control means 51 for performing a call registration when the user operates the call button in the hall (not shown), and a reception information management means 52 for temporarily storing call data, such as a bank, a machine number, a floor, transmitted from the elevator call registration server 5 and giving a call registration to the elevator control means 51 based on the stored call data upon reception of the approaching information from the elevator call registration server 5. The reception information management means 52 performs the call registration by determining a floor where the user gets on from the call data such as a bank, a machine number, and a floor.

The reception information management means 52 includes a call information storage unit 53 for storing portable terminal IDs and call data transmitted from the elevator call registration server 5, and a reception information management unit 54 for storing in the call information storage unit 53 the portable terminal IDs and the call data transmitted from the elevator call registration server 5, and giving a call registration to the elevator control means 51 upon reception of the approaching information from the elevator call registration server 5.

FIG. 8 shows a data structure of the call registration information stored in the call information storage unit 53. FIG. 8 shows the data structure of the stored call registration information. Fields store portable terminal IDs used for reservations, and records store banks, machine numbers, and floors, serving as call data, corresponding to the portable terminal IDs.

Figure 9:
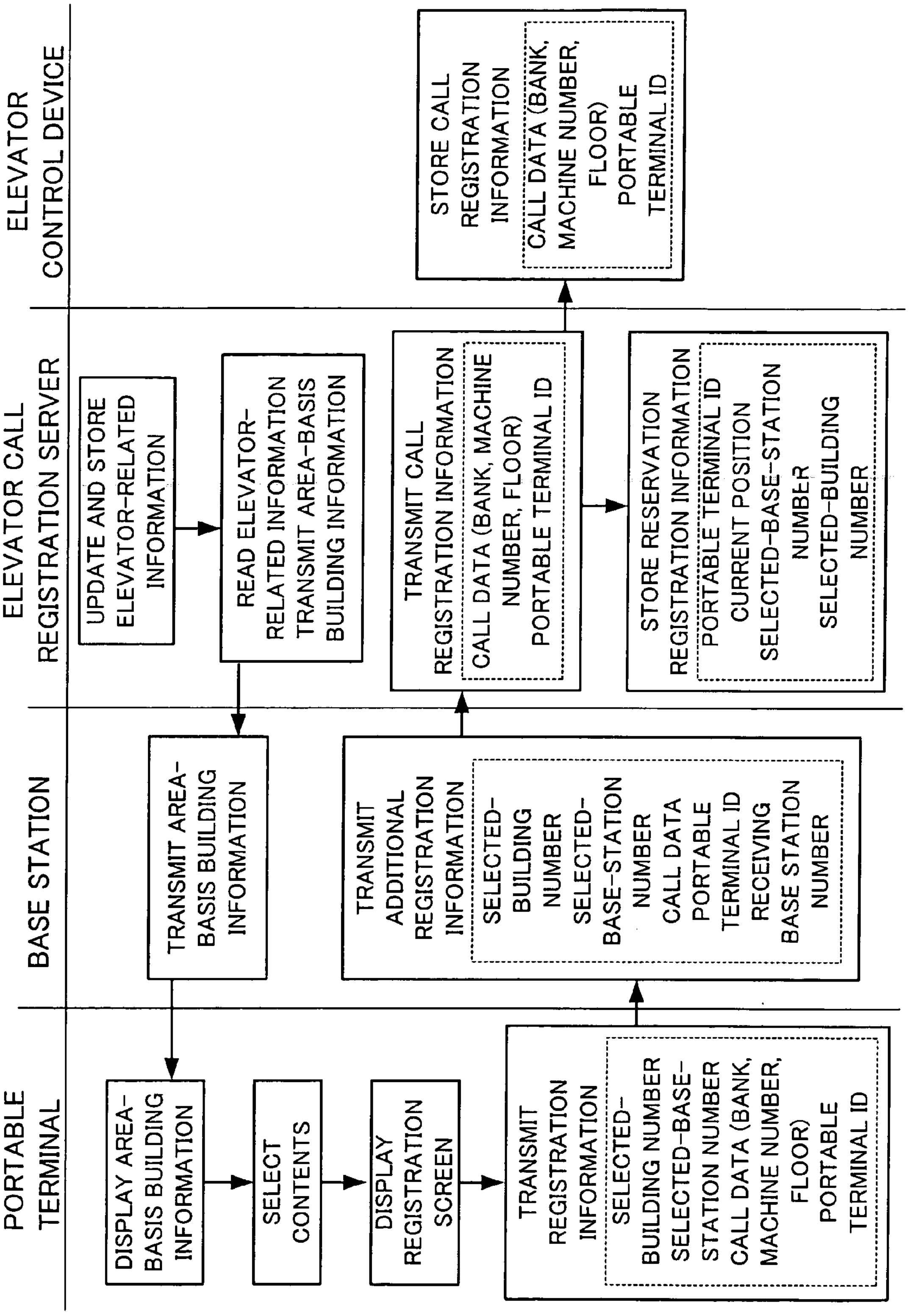
FIG. 9 is a diagram showing a procedure of making a reservation for the elevator call registration.

Next, a procedure of making a reservation for an elevator call registration will be described with reference to FIG. 9. FIG. 9 is a diagram showing the procedure of making a reservation for the elevator call registration.

Normally, the various-service control means 41 regularly or irregularly updates the elevator-related information such as tenant advertisements and events on the building 1 controlled by the elevator call registration server 5, and stores the elevator-related information in the service data storage unit 44. Thus, latest elevator-related information is stored in the service data storage unit 44.

Next, the call registration management means 42 regularly reads the elevator-related information from the service data storage unit 44, edits it to create area-basis building information, and transmits the area-basis building information to the base station (7*a*, 7*b*).

The base station (7*a*, 7*b*) radio-transmits the area-basis building information to the communication area (10*a*, 10*b*).

Figure 10:
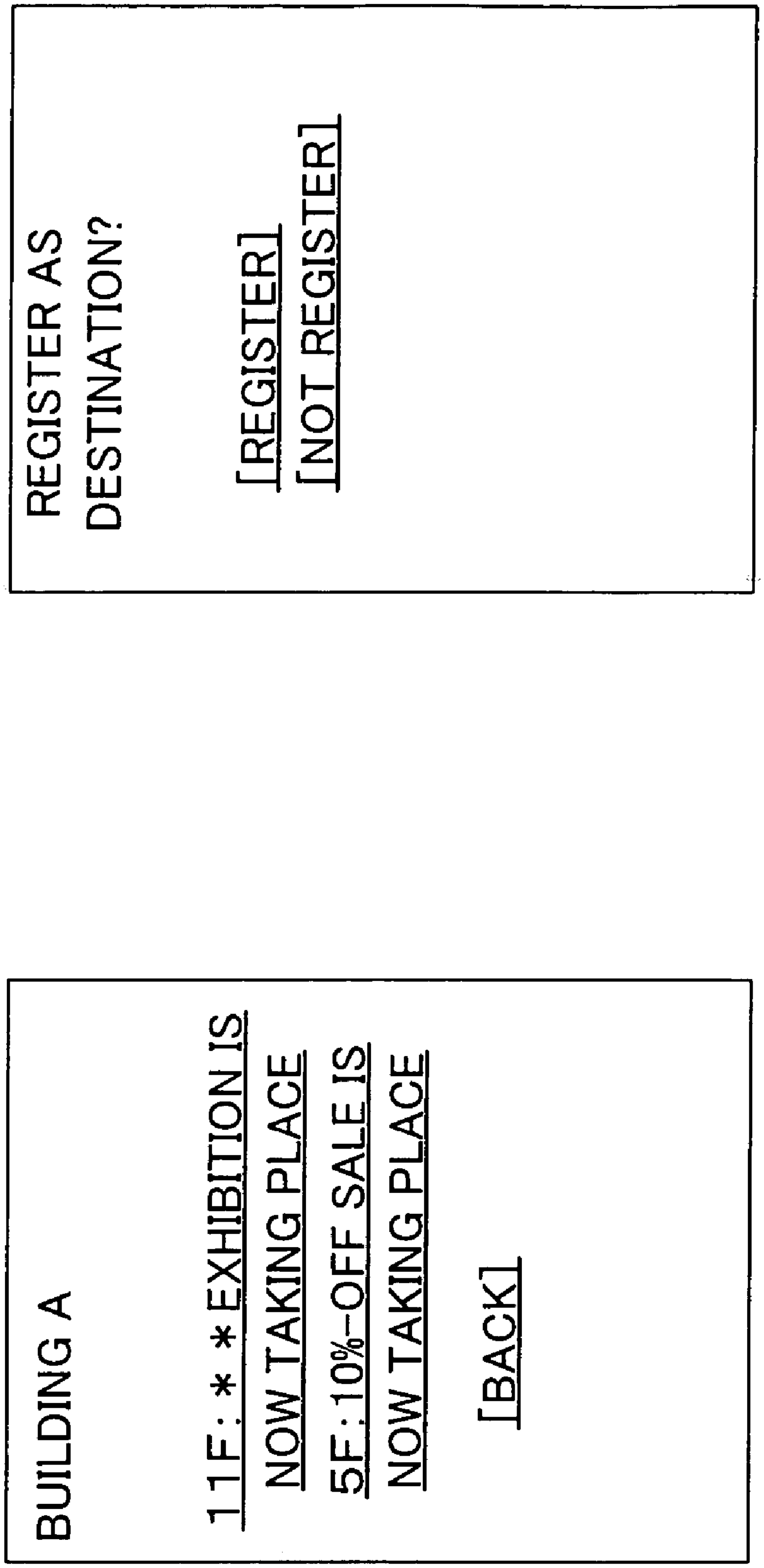
FIGS. 10(*a*) and 10(*b*) show a display example of a display screen of the portable terminal.

The portable terminal 8 receives the area-basis building information and displays contents of the area-basis building information on its display screen. FIG. 10(*a*) shows an example of the display screen displaying the contents. This example shows that in a building A, a 10%-off sale is now taking place on the fifth floor and a  exhibition is taking place on the eleventh floor. When the user selects a desired content from the display screen, a registration screen is displayed. FIG. 10**(*b*) shows an example of the registration screen. In this example, the user can perform registration by selecting "register". Upon the registration, there is created registration information including the building number of the selected building (hereinafter, referred to as a selected-building number), the number of a base station including the selected building in its communication area (hereinafter, referred to as a selected-base-station number), call data (such as a bank, a machine number, and a floor) for the selected building, and its own portable terminal ID. Then, the registration information is radio-transmitted to the base station (7*a*, 7*b*).

The base station (7*a*, 7*b*) adds its own base station number to the received registration information to create additional registration information and transmits the additional registration information to the elevator call registration server 5.

The transmission control unit 46 of the elevator call registration server 5 receives the additional registration information and outputs the additional registration information to the data processing unit 48. The data processing unit 48 identifies a corresponding building based on the additional registration information. Then, the data processing unit 48 transmits to the elevator control device 3 of the identified building the call data (the bank, the machine number, and the floor) and the portable terminal ID of the portable terminal used for the registration, as call registration information. At the same time, the data processing unit 48 stores in the storage unit 47 the portable terminal ID, the receiving base station number indicating the current position, the selected-base-station number, and the selected-building number, as reservation registration information.

The reception information management means 52 of the identified building 1 stores in the call information storage unit 53 the call registration information transmitted from the elevator call registration server 5.

Figure 11:
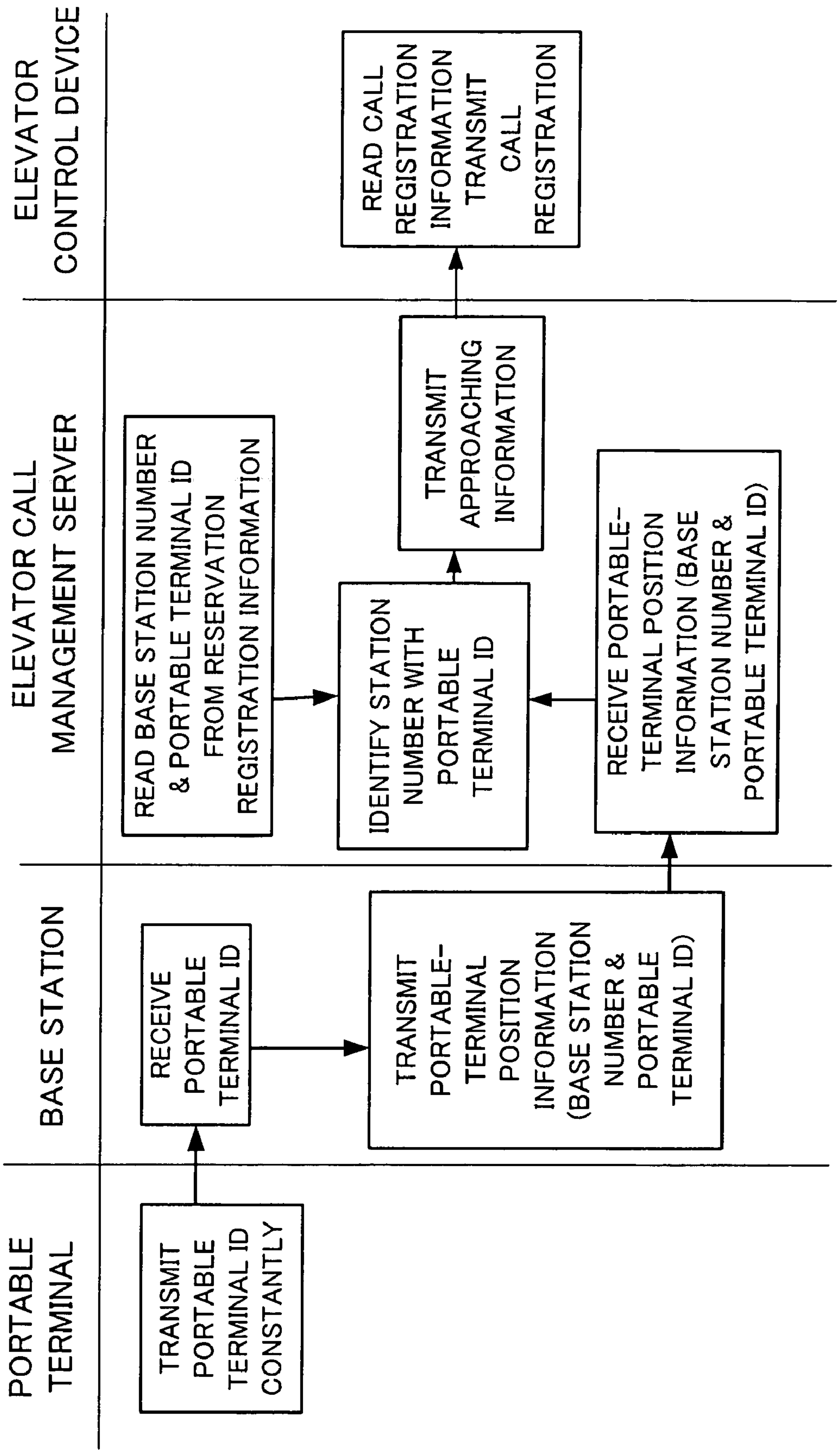
FIG. 11 is a diagram showing a procedure for a user who has reserved for the call registration to use the elevator.

Next, a procedure for the user who has reserved for the call registration to use an elevator will be described with reference to FIG. 11. FIG. 11 is a diagram showing the procedure for the user who has reserved for the call registration to use the elevator.

The portable terminal 8 constantly transmits its own portable terminal ID after the call registration reservation.

The base station (7*a*, 7*b*) transmits to the elevator call registration server 5 portable-terminal position information in which the received the portable terminal ID and its own base station number have been combined.

The call registration management means 42 receives the portable-terminal position information. At the same time, the call registration management means 42 reads the reservation registration information from the storage unit 47 and determines whether or not both pieces of information are identical. When they are determined to be identical, the call registration management means 42 transmits approaching information indicating that the user is in a vicinity of the building 1 to the reception information management means 52.

Upon reception of the notification of the user being in the vicinity of the building 1, the reception information management means 52 reads from the call information storage unit 53 call data based on the portable terminal ID of the user, and requests the elevator control means 51 to perform a call registration based on the call data. According to the request of the call registration, the elevator control means 51 controls the elevator driving device 11 to make the car 12 of the elevator 2 to move to the floor for which the call registration has been performed.

In the elevator call registration system described above, the elevator-related information is constantly transmitted from the elevator call registration server, and a call registration reservation for a desired elevator can be made by selecting contents from the information. Therefore, it is not necessary for the user side to access a site where necessary contents are stored, enabling an easy call registration reservation.

Further, since a call registration is performed by detecting that the user is approaching the reserved elevator, the car is arranged at a good timing and the user can smoothly go to a desired floor.

Further, different area-basis building information is distributed from the base stations, so the user can use more-related information.

Furthermore, each user can obtain information in real time so that the user can efficiently go around destinations.

Note that, in the first embodiment, although the call registration reservation is performed by selecting a building in a communication area different from that in which a base station the user communicates with is located, when the call registration is performed for an elevator of a building in the communication area in which the base station the user communicates with is located, the call registration information is transmitted to the elevator control device together with the approaching information and the call registration can be performed similarly to the case of using a hall call button. Thus, an elevator can be called without operating the hall call button so that the remote call registration is possible.

In the first embodiment, there has been described that when the registration information is transmitted from the portable terminal to the call registration management means, the call data has been transmitted to the elevator control device in advance. However, the call registration may be performed by transmitting the call data together with the approaching information to the elevator control device when the user approaches an elevator to use.

Second Embodiment

An elevator call registration system according to a second embodiment of the present invention is different from that of the first embodiment in that a base station is provided in each building, but is similar to in the other points. A description of the similar points is omitted.

In the elevator call registration system according to the second embodiment, since the base station is provided in the building and the elevator control device performs an elevator call registration when the user approaches a target elevator, unnecessary call registrations can be reduced. The user can efficiently go to a desired place without reducing efficiency in elevator operations.

The invention claimed is:

1. An elevator call registration system comprising:

a portable terminal carried by a user;

a plurality of base stations that exchanges signals with the portable terminal in respective communication areas;

an elevator call registration server that manages an elevator call registration requested via the base station by the user who carries the portable terminal; and an elevator control device that registers an elevator call registration based on an instruction from the elevator call registration server, wherein the portable terminal transmits registration information to one of the base stations based on a various-service guide menu constantly transmitted from the elevator call registration server, and periodically transmits its own portable terminal identification information to the base station, each base station comprises a wireless transmission unit that transmits the various-service guide menu to the portable terminal, and an output unit that transmits additional registration information, in which own base station identification information is added to the registration information received, to the elevator call registration server and outputs portable-terminal position information, in which the own base station identification information is added to the portable terminal identification information received, to the elevator call registration server, and the elevator call registration server constantly transmits the various-service guide menu to the portable terminal, identifies a corresponding elevator based on the registration information added and transmitted from the portable terminal via the base station, stores, as reservation registration information, base station identification information of the base station that is provided in a communication area in which a building, having installed therein the elevator identified, is located, and the portable terminal identification information of the portable terminal, determines, from the portable-terminal position information concerning the portable terminal and the reservation registration information, whether the portable terminal is in the communication area in which the building is located, and instructs, when the portable terminal is in the communication area, the elevator control device that the user is approaching and transmits elevator call data.

2. The elevator call registration system according to claim 1, wherein the base station is located in the building.

3. The elevator call registration system according to claim 1, wherein the various-service guide menu transmitted from each of the base stations is different.

* * * * *